United States Patent [19]

Hekimian

[11] 3,818,359

[45] June 18, 1974

[54] LINE EQUALIZER CIRCUIT EMPLOYING ACTIVE GYRATOR

[75] Inventor: Norris C. Hekimian, Rockville, Md.

[73] Assignee: Hekimian Laboratories, Inc., Rockville, Md.

[22] Filed: Nov. 29, 1972

[21] Appl. No.: 310,566

[52] U.S. Cl. .............. 328/167, 330/126, 333/28 R, 333/80 R

[51] Int. Cl. .......................... H03b 3/04, H04b 1/12

[58] Field of Search ........... 328/167; 330/107, 109, 330/126; 333/28 R, 80 R

[56] References Cited

UNITED STATES PATENTS 3,446,996 5/1969 Toffler ............................ 333/28 X 3,701,955 10/1972 Spencer .......................... 333/28 R

*Primary Examiner*—John Zazworsky

*Attorney, Agent, or Firm*—Rose & Edell

[57] ABSTRACT

A line equalizer employs an operational amplifier having an inverting input terminal to which the input signal is resistively coupled and a non-inverting input signal to which the input signal is coupled via a bandpass filter. The filter includes an active gyrator circuit to simulate an inductance and is easily tuned to obtain the desired center frequency. Gain and delay adjustment is achieved simply and quickly by means of respective variable resistors.

9 Claims, 3 Drawing Figures

LINE EQUALIZER CIRCUIT EMPLOYING ACTIVE GYRATOR

BACKGROUND OF THE INVENTION

The present invention relates to equalizer circuits and particularly to active delay equalizer circuits which are devoid of inductors.

In numerous communication and data systems, signal components at different frequencies are subject to different degrees of delays and attenuation, thereby distorting the signals passing through the system. To compensate for this attenuation and delay variation, equalizer circuits are employed. A typical equalizer circuit consists of a number of individual equalizer circuits connected in cascade, each introducing gain and delay compensation over a respective frequency range.

Most prior art equalizers have been characterized by heavy transformers which, aside from their bulk and weight, are sensitive to magnetic fields, have poor stability, and are rather costly. A few attempts to provide inductorless equalizer circuits have been somewhat less than successful. For example, U.S. Pat. No. 3,506,856 to Toffler et al., discloses an inductorless delay equalizer in which a twin-T RC filter is connected in a feedback loop comprising one of two summed signal channels. The filter provides the required frequency dependent gain and delay characteristic; however, frequency tuning of the circuit becomes extremely tedious because it requires simultaneous adjustment and tracking of several filter components. Moreover, the permissible input signal amplitude range is severely limited in this approach.

One other known approach to providing an inductorless equalizer circuit utilizes pole-zero design theory to realize desired gain and dealy versus frequency characteristics with RC circuits. This approach results in a circuit which functions adequately but which requires an exceedingly large number of circuit components.

It is therefore an object of the present invention to provide an active inductorless equalizer circuit which is relatively easy to tune, has a wide input signal range, and yet is simple in nature and requires relatively few circuit components.

SUMMARY OF THE INVENTION

According to the present invention, an active inductorless equalizer circuit employs an operational amplifier having inverting and non-inverting terminals. The input signal is resistively coupled to the inverting input terminal and is coupled to the non-inverting input terminal via a bandpass filter which includes a parallel-connected capacitor and active gyrator circuit. The gyrator circuit is an operational amplifier gyrator which is easily tuned, is extremely stable, and acts as a low-impedance, stable gain driving circuit for the non-inverting input terminal of the equalizer operational amplifier. The use of a bandpass filter, rather than a band reject filter, permits simple circuit set-up without requiring matching of the high and low frequency responses of the filter.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

The equalizer circuit of the present invention employs an active gyrator circuit, containing resistive and capacitor elements, in combination with a capacitor to form a bandpass filter. There are numerous active gyrator circuits employing operational amplifiers in the prior art; however, the one most suitable for present purposes is that disclosed by R.H.S. Riordan in "Electronics Letters," vol. 2, No. 2, Feb. 1967, at pages 50–51. The Riordan Gyrator is illustrated in FIG. 1 of the accompanying drawings.

Figure 1:
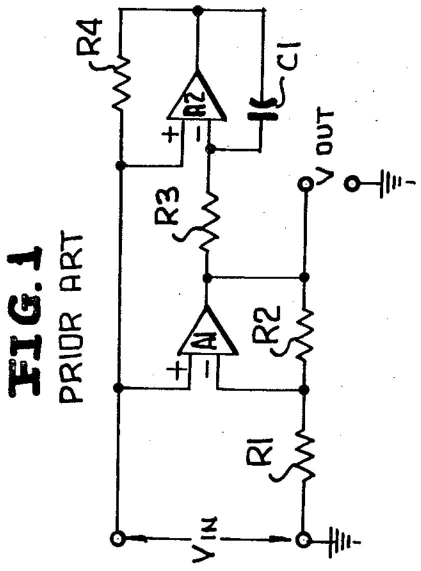
FIG. 1 PRIOR ART
FIG. 1 is a schematic diagram of a prior art active gyrator circuit employed in the present invention.

Referring to FIG. 1, the Riordan gyrator is a two-port device and comprises two operational amplifiers A1 and A2, each having inverting (−) and non-inverting (+) input terminals. The non-inverting input terminal of both amplifiers A1 and A2 are connected to one circuit port; the other circuit port is grounded and coupled via resistor R1 to the inverting input terminal of amplifier A1. The output terminal of amplifier A1 is connected via resistor R3 to the inverting input terminal of amplifier A2. Negative feedback for amplifier A1 is provided via resistor R2. Negative feedback for amplifier A2 is provided by capacitor C1; positive feedback for that amplifier is via resistor R4. Circuit output signals are taken from the output terminal of amplifier A1.

As described in the Riordan article, the circuit between the two ports behaves as an inductance L1 having the value:

$$L1 = [(R1)\ (R3)\ R4)\ (C1)]/(R2) \tag{1}$$

The circuit can also be considered as having a gain factor *K*.

Figure 2:
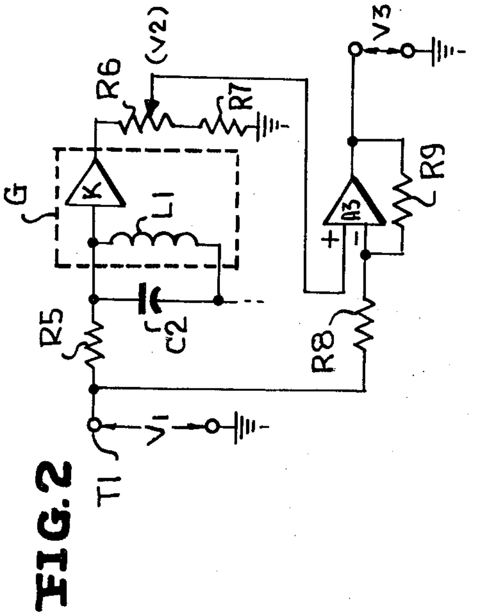
FIG. 2 is a simplified schematic diagram of an equalizer circuit of the present invention.

Referring to FIG. 2 of the accompanying drawings, the Riordan gyrator circuit of FIG. 1 is employed in an equalizer circuit and is designated as circuit G, having an effective inductance L1 and gain K. The gyrator circuit is connected in parallel with a capacitor C2, the parallel combination being connected in series with a resistor R5 between input terminal T1 and ground. An input voltage (VI) for the equalizer circuit is applied between terminal T1 and ground. Capacitor C2 and the effective inductance L1 form a bandpass filter having a center frequency with the value $1/2\pi\ \sqrt{LC}$. The effective gain factor of circuit G is illustrated as an amplifier K having its input terminal connected to the junction of R5 and L1. The output terminal of amplifier K is returned to ground across series-connected potentiometer R6 and resistor R7.

The wiper arm of R6 applies a voltage (V2) to the non-inverting input terminal of an operational amplifier A3. The inverting input terminal of amplifier A3 is resistively coupled to input terminal T1 via resistor R8. Negative feedback for A3 is provided by resistor R9, and the output signal (V3) for the equalizer circuit is provided between the output terminal of amplifier A3 and ground.

The signal amplitude versus frequency characteristic between terminal T1 and the non-inverting input terminal (+) of amplifier A3 is V2/V1 and may be represented as follows:

$$V2/V1 = K\alpha\, p(L1)/[p^2(L1)\,(C2) + p^{(L1)/(R5)} + 1] \quad (2)$$

where $p$ is the familiar transform operator and is equal to $jw$, and $\alpha$ is the attenuation factor provided by R6 and R7 and is determined by the setting of R6. Simplifying euqation 2 for purposes of the following analysis:

$$V2/V1 = K\alpha\ (X/Q)/X^2 = X/Q = 1) \quad (3)$$

where $X = jw/w_o$; $w_o = [1/\sqrt{(L1)\ (C2)}]$; and $Q = (R5)/w_o(L1)$.

The overall output signal V3 for the circuit of FIG. 2 may be represented as follows:

$$V3 = (R9/R8)\ (V1) + (R9 + R8/R8)\ (V2) \quad (4)$$

Upon further simplification it can be shown that the following expression represents the gain of the equalizer circuit:

$$V3/V1 = -\beta\ \{ (X^2 - [(1+\beta)K\alpha - 1]X/Q + 1)/[(X^2 + X/Q + 1)]\} \quad (5)$$

where $\beta = R9/R8$.

From expression 5 it can be discerned that the gain of the equalizer circuit is $-\beta$ for signal frequencies of zero or infinity (i.e., $X=0$; $X=\infty$). At the center of the passband (i.e., $w = w_o$; or $X=j$), it can be discerned that the equalizer circuit gain is $\beta[(1+\beta)K\alpha - 1]$. Significantly, it will be observed that, although the shape of the gain characteristic is dependent upon L1 and, therefore, Q, the maximum and minimum gain values are independent of these parameters. This fact facilitates the tuning of cascaded equalizer sections which cover respective adjacent frequency bands. The width of the circuit passband is of course determined by R5, C2 and L1; the latter, as noted in relation to FIG. 1 and expression 1, depends on R1, R2, R3, R4 and C1. In a practical embodiment of the equalizer circuit, C2 and L1 would be maintained constant once set; R5 would be adjusted to achieve pass band control.

By similar analysis it can be shown that the signal delay through the equalizer circuit, which delay is the derivative of phase angle with respect to frequency, peaks at the pass band center frequency. That is, the maximum value of delay occurs at the center frequency; the minimum delay (i.e., −zero) occurs at infinite frequency; and the delay at DC is dependent upon the circuit Q. For high values of Q the delay at DC is approximately zero; for low values of Q the DC delay approximates the maximum delay. The delay is readily adjustable by adjusting the value of R5, thereby permitting L1 to remain constant while the delay is adjusted.

Figure 3:
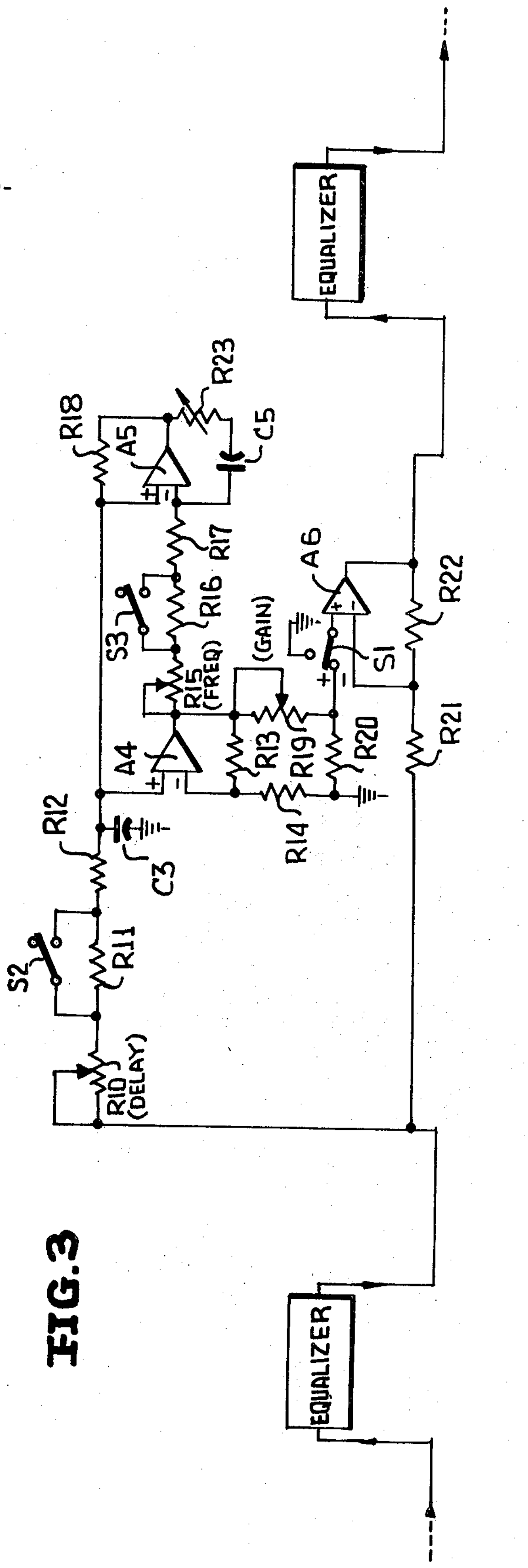
FIG. 3 is a detailed schematic diagram of an equalizer circuit according to the present invention.

A practical embodiment of the equalizer circuit of the present invention is illustrated in FIG. 3. A series of equalizer circuits, each covering a specific frequency band, are selectively switched in and out of a signal transmission line which, for example, may be a telephone line. Except for three frequency determinative resistors R15, R16 and R17, components in all equalizer circuits are identical; consequently, only one equalizer circuit is illustrated in detail.

Single pole-double throw switch S1 is selectively operable to insert the equalizer circuit in the signal line or to by-pass the circuit. Table I lists components of the circuit of FIG. 3 in the left-hand column and the FIG. 1 and 2 components to which they correspond in the right hand column.

TABLE I

| FIG. 3 components | FIGS. 1 and 2 components |
|---|---|
| R10, R11, R12 | R5 (FIG. 2) |
| R13 | R2 (FIG. 1) |
| R14 | R1 (FIG. 1) |
| R15, R16, R17 | R3 (FIG. 1) |
| R18 | R4 (FIG. 1) |
| R19 | R6 (FIG. 2) |
| R20 | R7 (FIG. 2) |
| R21 | R8 (FIG. 2) |
| R22 | R9 (FIG. 2) |
| C3 | C2 (FIG. 2) |
| C5 | C1 (FIG. 1) |
| A4 | A1 (FIG. 1) |
| A5 | A2 (FIG. 1) |
| A6 | A3 (FIG. 2) |

Resistors R10, R15 and R19 are potentiometers and resistors R11 and R16 are selectively shorted out by respective switches S2 and S3. Potentiometer R15 and resistors R16 and R17 determine the center frequency of the circuit and, as mentioned above, change values in the various cascaded equalizer circuits. Potentiometer R15 is a factory-adjusted potentiometer and permits the center frequency to be varied over a small but continuous frequency band. Switch S3 permits the center frequency to be shifted by a discrete amount. Specifically, when S3 is closed, thereby shorting out R16, the center frequency rises to an extent determined by the value of R16 as compared to the sum of the values of R15 and R17; when switch S3 is opened, the center frequency decreases by the same amount. It will be noted that a change in the setting of R15 or the position of switch S3 is effectively a change in the value of R3 in FIG. 1. From expression 1 it is noted that R3 determines the value of L1; thus, the center frequency in the circuit of FIG. 1 is changed by changing the effective inductance L1. An expression 6 relating R3 of FIG. 1 (or the total resistance of R15, R16 and R17 of FIG. 3) to the center frequency ($f_o$) of the circuit is as follows:

$$R3 = R13/[(2\pi f_o)^2(C3)\ (C5)\ (R18)\ (R14)] \quad (6)$$

Gain adjustment is provided by R19, which also has an appreciable affect on the delay characteristic of the circuit. When the circuit is being set up in situ, the usual procedure is to adjust R19 to obtain the desired gain characteristic. When this is completed, delay adjustment may be effected by means of R10 with negligible affect on the gain.

Potentiometer R10 permits control of signal delay over a continuous range. Switch S2, when closed, shorts out R11 to lower the value of the circuit Q and reduce the signal delay. When S2 is open the delay is increased. By proper selection of values for R10, R11 and R12, the two positions of S2 can afford two contiguous ranges of delay within which potentiometer R10 is operative to select the actual delay. S2 thus serves as a delay range shift element.

The set-up procedure as described above for the circuit of FIG. 3 is thus extremely simple and involves a minimum of interacting adjustable components.

Potentiometer R23 serves to compensate the gyrator circuit and prevents the gyrator impedance from including a negative non-reactive component which would cause it to stray from acting as a pure inductance. Specifically, the problem arises because amplifier A4 has a lagging phase angle and a parasitic capacitance appears between the inverting input terminal of amplifier A5 and ground. There are a number of possible approaches to effect the required compensation. One approach is to compensate amplifier A4 with a phase lead circuit; another is to introduce a phase lag in the degenerative feedback path for amplifier A5. The former is feasible by shunting R14 with a capacitor; however such capacitor depends upon the values of stray capacitance in the circuit and of R13 and R14 and must be a variable capacitor if the design value of the gyrator inductance is to remain unchanged. Variable capacitors are often space-consuming and costly. It is more desirable to utilize a variable resistance, such as R23, in the negative feedback circuit for amplifier A5. R23 can be easily adjusted to compensate for the effects of a lagging phase angle in amplifier A4 which, when combined with capacitor C3, impart a negative conductance component to the gyrator admittance. Although R23 acts to reduce the Q factor of the feedback circuit somewhat, this does not affect gyrator inductance; nor is the d.c. performance of the gyrator affected since R23 is in series with C5.

Table II lists typical values for the components of FIG. 3, it being understood that these values are representative of only one of the possible embodiments and are not limiting on the scope of the present invention.

TABLE II

| Component | Value |
|---|---|
| R10 | 24 K ohms |
| R11 | 24 K ohms |
| R12 | 2 K ohms |
| R13 | 2 K ohms |
| R14 | 4 K ohms |
| R18 | 1 K ohms |
| R19 | 24 K ohms |
| R20 | 24 K ohms |
| R21 | 10 K ohms |
| R22 | 10 K ohms |
| R23 | 100 ohms |
| C3 | 0.047 $\mu$f |
| C5 | 0.047 $\mu$f |

As mentioned above, the values of R15, R16 and R17 depend upon the desired center frequency for the circuit. In a circuit having the component values listed in table II, a center frequency of 1 KHz is achieved if R15 is 2 K ohms, R16 is 994 ohms, and R17 is 3.74 K ohms. For these values, the closing of switch S3 effects a 100 Hz rise in the center frequency of the circuit passband.

For the component values of R10, R11 and R12 of Table II, the closed position of S2 permits R10 to be varied to achieve a delay range of approximately 0 to 3 ms; when S2 is opened the delay is 3 to 6 ms. Gain variation, by means of R19, is possible over a range of ± 6 db at center frequency.

The several advantages of the circuit of FIG. 3 should now be evident. For example, frequency tuning is effected with a single potentiometer (R15) and is not affected by gain and/or delay adjustment. Moreover, frequency stability depends upon the stability of the effective inductance (L1) which, in turn, is determined by resistors and capacitors; the latter are much more stable and do not require elaborate compensation schemes necessitated by actual inductors. Moreover, the inductor realized by circuit G provides the equalizer circuit with a perfectly lossless inductance; this cannot be realized with real inductors without careful control of regenerative circuits trimmed to the particular inductor employed.

By employing a line equalizer based on bandpass rather band-reject circuitry, the asymptotic high and low frequency responses of the filter do not have to be separately matched. This factor alone permits a significant time saving during set up.

The peak permissible input signal amplitude for the circuit is determined by the gain of A4 as set by R13 and R14; for the component values in Table II, this is about two-thirds of the supply voltage. This relatively large permissible input signal permits operation at the maximum possible dynamic range of the circuit and minimizes possible signal to noise ratio problems.

Another advantage of the equalizer circuit of the present invention is the fact that frequency, delay and gain adjustment is accomplished with relatively inexpensive variable resistors rather than capacitors or inductors.

While I have described and illustrated specific embodiments of my invention, it will be clear that variations of the details of construction which are specifically illustrated and described may be resorted to without departing from the true spirit and scope of the invention as defined in the appended claims.

I claim:

1. An equalizer circuit comprising:
input means for receiving signals from a transmission line;
an operational amplifier having an inverting input terminal, a non-inverting input terminal, an output terminal and feedback means connected between said output terminal and said inverting input terminal;
a first frequency-insensitive signal path connected between said input means and said inverting input terminal; and
a second frequency-sensitive signal path connected between said input means and said non-inverting input terminal, said second signal path including a bandpass filter comprising capacitor means and an inductorless gyrator circuit.

2. The circuit according to claim 1 wherein said gyrator circuit is an active circuit connected in parallel with said capacitor means, said gyrator circuit comprising:
first and second operational amplifiers, each having inverting and non-inverting input terminals and an output terminal;
means connecting the non-inverting input terminals of both of said first and second operational amplifiers to one side of said capacitor means;
first resistive means connected between the inverting input terminal of said first operational amplifier and the other side of said capacitor means;
second resistive means connected between the output terminal and inverting input terminal of said first operational amplifier;
third resistive means connected between the output terminal of said first operational amplifier and the inverting input terminal of said second operational amplifier;
fourth resistive means connected between the output terminal and non-inverting input terminal of said second operational amplifier;

and further capacitive means connected between the output terminal and inverting input terminal of said second operational amplifier.

3. The circuit according to claim 2 wherein said first signal path and said feedback means are resistive and have the same resistance.

4. The circuit according to claim 2 wherein said third resistive means is adjustable to permit variation of the center frequency of said bandpass filter.

5. The circuit according to claim 2 further comprising adjustable resistive means connected in series between said input means and said bandpass filter to permit variation of the delay experienced by a signal passing through said circuit.

6. The circuit according to claim 2 wherein said second signal path further comprises gain adjustment means for selectively varying the gain of said circuit.

7. The circuit according to claim 2 wherein said other side of said capacitor means is connected to ground.

8. The circuit according to claim 2 further comprising variable resistive means connected in series with said bandpass filter between said input means and ground, said variable resistive means comprising:

a potentiometer;

a fixed resistor; and a switch connected in parallel with said fixed resistor and selectively actuable to short out said fixed resistor.

9. An equalizer circuit for use in conjunction with a signal transmission line, said circuit comprising:

a differential operational amplifier having first and second input terminals and an output terminal which provides an output voltage which is proportional to the difference between the voltage appearing across said input terminals;

resistive coupling means for applying signal from said transmission line to said first input terminal;

a bandpass filter circuit having input and output terminals and comprising a capacitor and an active inductorless gyrator circuit connected in parallel;

coupling means for applying signal from said transmission line to said bandpass filter input terminal; and actuable switching means connected between said bandpass filter output terminals and said second input terminal to permit selective connection of said bandpass filter to said second input terminal.

* * * * *